United States Patent
Xiong et al.

(10) Patent No.: US 10,031,726 B1
(45) Date of Patent: Jul. 24, 2018

(54) FLOWCHART GENERATING METHOD AND FLOWCHART GENERATING APPARATUS BASED ON QT 2D GRAPHIC VIEW

(71) Applicant: UBTECH Robotics Corp., Shenzhen (CN)

(72) Inventors: Youjun Xiong, Shenzhen (CN); Zhiping Zhou, Shenzhen (CN); Lin Chen, Shenzhen (CN)

(73) Assignee: UBTECH ROBOTICS CORP., Shenzhen (CN)

(*) Notice: Subject to any disclaimer, the term of this patent is extended or adjusted under 35 U.S.C. 154(b) by 0 days.

(21) Appl. No.: 15/494,521

(22) Filed: Apr. 23, 2017

(30) Foreign Application Priority Data

Dec. 31, 2016 (CN) .......................... 2016 1 1263418

(51) Int. Cl.
*G06F 9/44* (2018.01)
*G06F 8/34* (2018.01)
*G06F 8/30* (2018.01)
*G06F 8/35* (2018.01)

(52) U.S. Cl.
CPC ............... *G06F 8/34* (2013.01); *G06F 8/313* (2013.01); *G06F 8/35* (2013.01)

(58) Field of Classification Search
None
See application file for complete search history.

(56) References Cited

U.S. PATENT DOCUMENTS

2003/0038813 A1* 2/2003 Lu .......................... G06T 17/20
345/582

* cited by examiner

*Primary Examiner* — Chuck Kendall

(57) ABSTRACT

The present disclosure discloses a flowchart generating method including steps of: designing a main process and a sub-module of a flowchart; wherein the main process includes a main process start, a sub-module port, and a main process end. The sub-module includes a sub-module node, and the sub-module node includes a sub-module entry node, a sub-module exit node, and a sub-module interrupted node; establishing a connection relationship between the sub-module and the sub-module port. The present disclosure may support cross-platform development. Therefore, resources depended by the present disclosure may be reduced, and a third-part software may not be installed.

20 Claims, 5 Drawing Sheets

FLOWCHART GENERATING METHOD AND FLOWCHART GENERATING APPARATUS BASED ON QT 2D GRAPHIC VIEW

CROSS REFERENCE TO RELATED APPLICATIONS

This application claims priority to Chinese Patent Application No. 201611263418.7, filed Dec. 31, 2016, which is hereby incorporated by reference herein in its entirety.

BACKGROUND

1. Technical Field

The present disclosure generally relates to a field of flowchart design, and particularly to a flowchart generating method and a flowchart generating apparatus.

2. Description of Related Art

A flowchart software based on Microsoft Foundation Classes (MFC) may provide an user to design and develop a flowchart. However, the flowchart software based on MFC may support Windows™ operating system, and may need to be supported by a third-part database. Therefore, expansibility of the flowchart software is weak. In order to support cross-platform development and to avoid installing a third-party software, a software to implement a flowchart generating method is needed to be developed.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
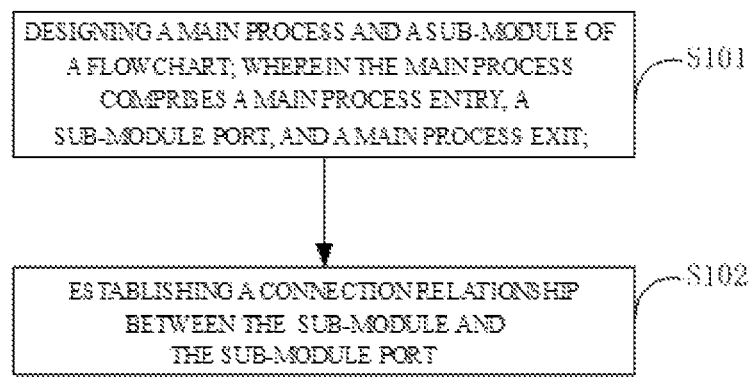
FIG. 1 is a flowchart of a flowchart generating method of a first embodiment of the present disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

With reference to FIG. 1, a first embodiment of the present disclosure provides a flowchart of a flowchart generating method. The flowchart generating method includes the following steps. In step S101, designing a main process and a first sub-module of a flowchart. The main process includes a main process start, a first sub-module node, and a main process end.

The flowchart is designed by an application program of a QT graphic user interface.

In the embodiment, the present disclosure is implemented by QT 2D graphic view architecture to design internal processes of a robot. The QT 2D graphic view architecture provides a manager that may support interaction of customized 2D graphic objects, and a view that may support a zooming operation and a rotating operation. The QT 2D graphic view architecture includes an event broadcasting architecture. The event broadcasting architecture may support a precise interacting ability of a scene manager, and may show variation of an object position or of an object size though double-precision floating-point format. The main process is designed at first. The main process is the only entry and the only exit of a logic programming. The main process includes the main process start, the first sub-module node, and the main process end. The main process may further include the first sub-module to connect to the first sub-module node.

The first sub-module includes a first sub-module node. The first sub-module node includes a first sub-module entry node, a first sub-module exit node, and a first sub-module interrupted node.

The first sub-module may further include a sub-process module, a motion module, an event module, and a logic module. The sub-process module, the motion module, the event module, and the logic module may respectively include an entry node, an exit node, and an interrupted node to connect to other modules and stop running the other modules. The modules may simultaneously run due to the multithreading.

Each of the modules may carry on items of the QT 2D graphic view architecture. Each of the modules may design a form of their own through a scene system of the QT software, may add a particular function, and may include a port. The items may be shown through a view port. The main process may include only one view port, but may include multiple scenes.

In step S102, establishing a connection relationship between the sub-module and the sub-module port.

The sub-module may be embedded in the main process, and the sub-module may be called in the main process.

Since the application program of the QT graphic user interface may design the main process and the sub-module and may design the nodes of the modules, the modules may be easily called and the connection relationship may be easily established to design and develop the flowchart. Therefore, cross-platform development may be supported, less resource may be apply, and a third-part software may not be installed.

Figure 2:
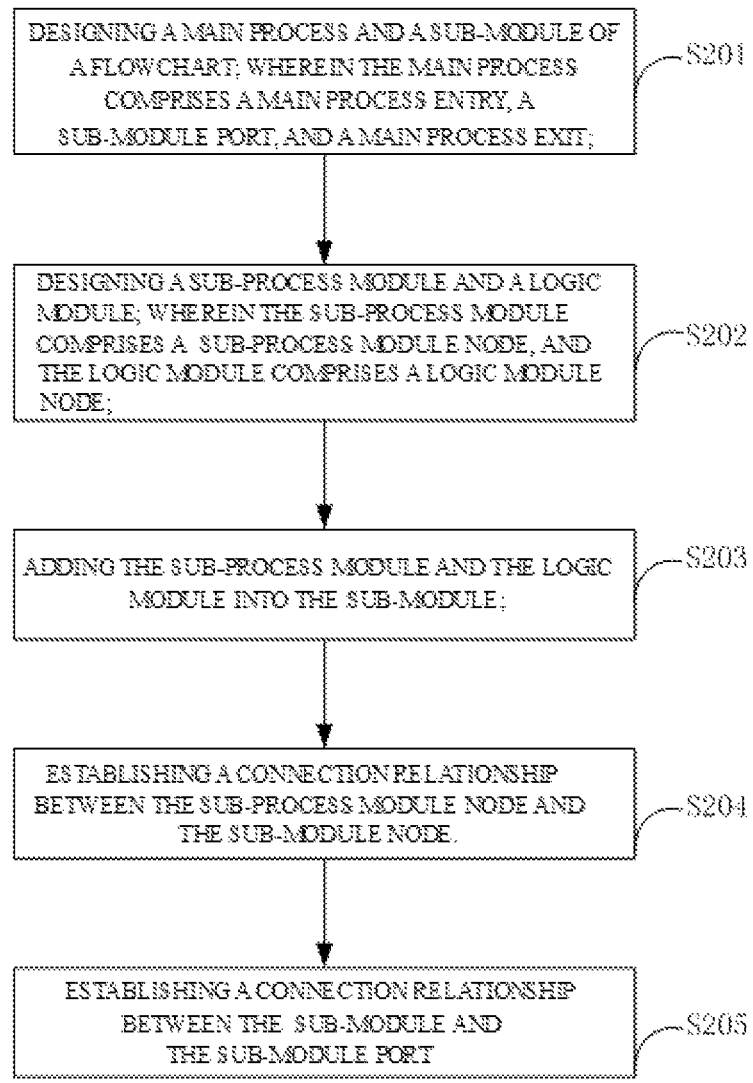
FIG. 2 is a flowchart of a flowchart generating method of a second embodiment of the present disclosure.

With reference to FIG. 2, a second embodiment of the present disclosure provides a flowchart of a flowchart generating method. The flowchart generating method includes the following steps.

In step S201, designing a main process and a sub-module. The main process may include a main process start, a sub-module port, and a main process end.

The sub-module may include the sub-module node, and the sub-module node may include a sub-module entry node, a sub-module exit node, and a sub-module interrupted node.

In step S202, designing a sub-process module and a logic module. The sub-process module may include a sub-process module node, and the logic module may include a logic module node.

In step S203, adding the sub-process module and the logic module into the sub-module.

In step S204, establishing a connection relationship between the sub-process module node and the sub-module node.

The sub-process module and the logic module may be designed. The sub-process module may include a sub-process module node, and the logic module may include a logic module node. The sub-process module and the logic module may respectively include an entry node, an exit node, and an interrupted node. The connection relationship between the sub-process module node and the sub-module node may be established. The logic module may include a corresponding condition, a number of cycles. When the logic module is implemented, modules connected to corresponding entry nodes, corresponding exit nodes, and corresponding interrupted nodes may be implemented according to the corresponding condition and the number of cycles.

In step S205, establishing a connection relationship between the sub-module and the sub-module port.

The step S201 and the step S205 of the second embodiment are respectively the same as the step S101 and the step S102 of the first embodiment.

Since the sub-process module and the logic module may be designed and the sub-process module may be connected to the sub-module node through the sub-process module node, the flowchart may be easily transformed and may have clear logic.

Figure 3:
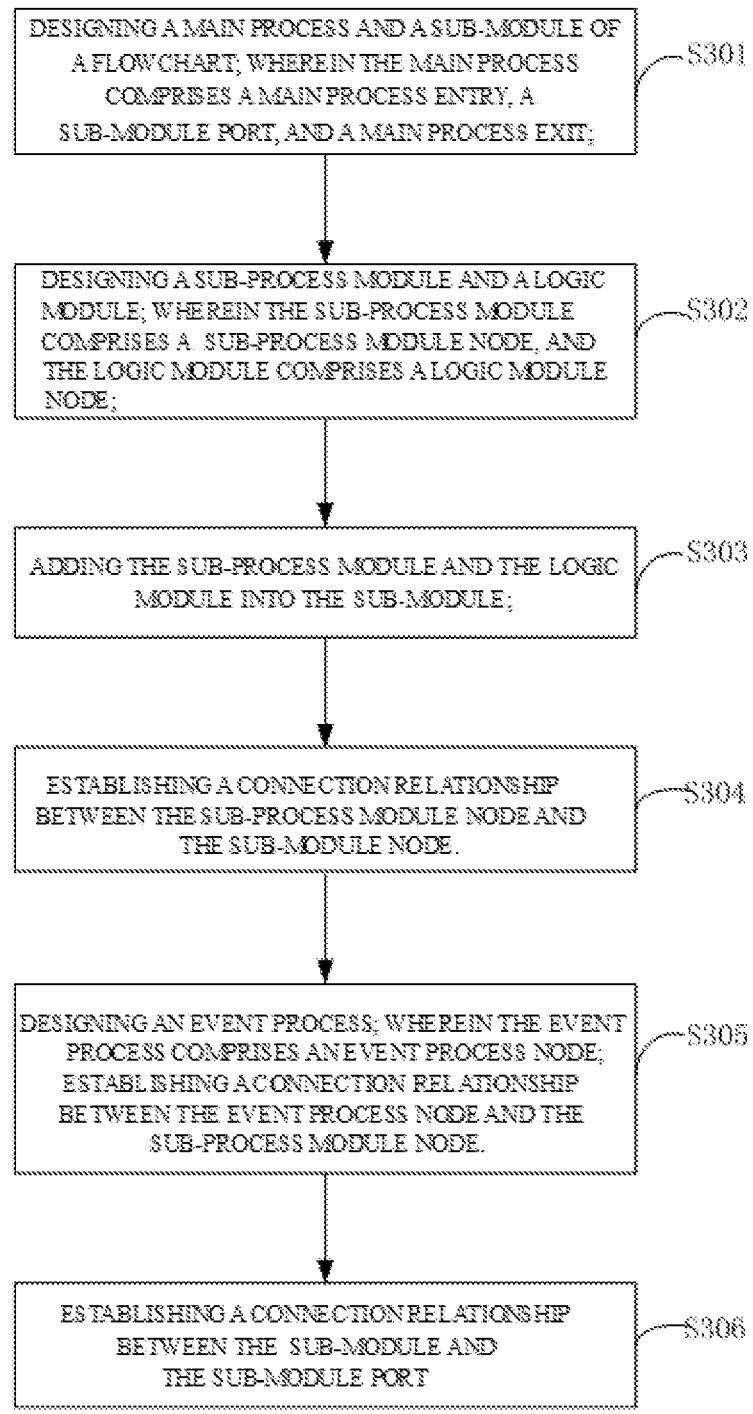
FIG. 3 is a flowchart of a flowchart generating method of a third embodiment of the present disclosure.
Figure 4:
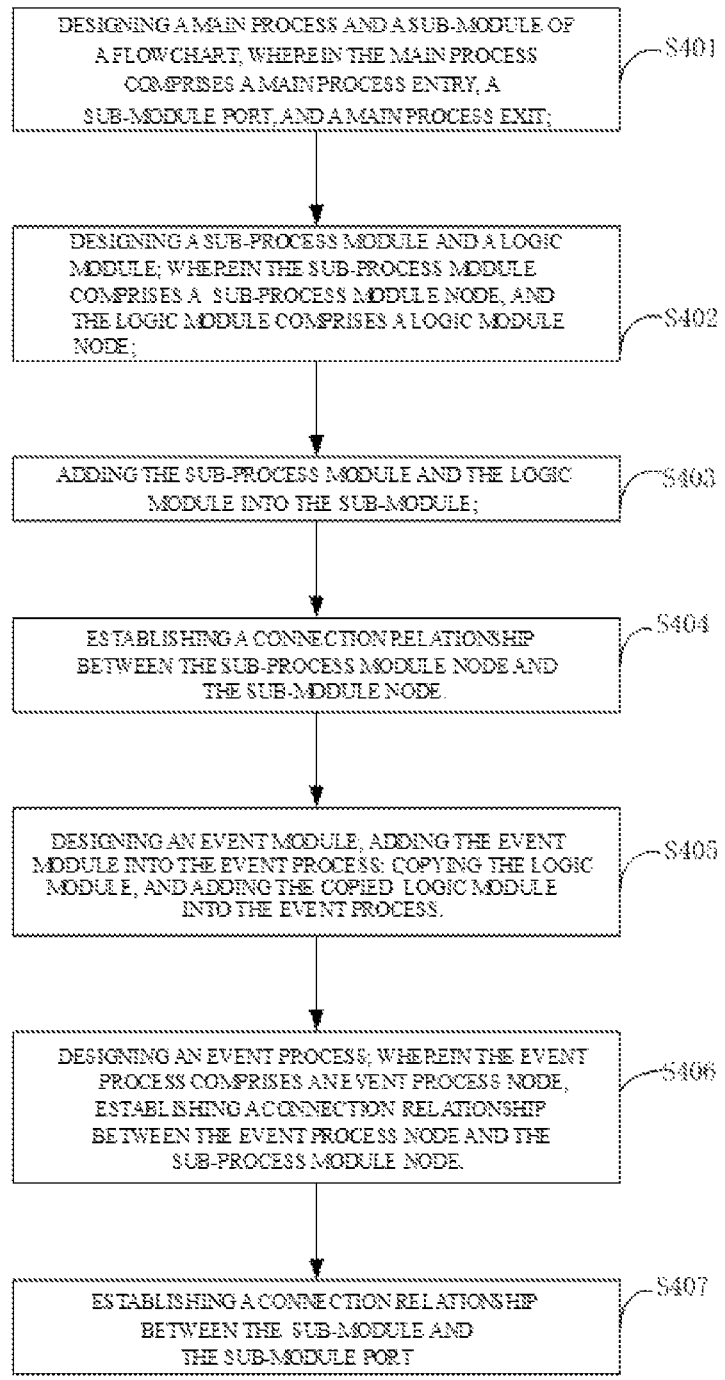
FIG. 4 is a flowchart of a flowchart generating method of a fourth embodiment of the present disclosure.

With reference to FIG. 3, a third embodiment of the present disclosure provides a flowchart of a flowchart generating method. The flowchart generating method includes the following steps.

In step S301, designing a main process and a sub-module. The main process may include a main process start, a sub-module port, and a main process end.

The sub-module may include the sub-module node, and the sub-module node may include a sub-module entry node, a sub-module exit node, and a sub-module interrupted node.

In step S302, designing a sub-process module and a logic module. The sub-process module may include a sub-process module node, and the logic module may include a logic module node.

In step S303, adding the sub-process module and the logic module into the sub-module.

In step S304, establishing a connection relationship between the sub-process module node and the sub-module node.

In step S305, designing an event process. The event process may include an event process node, and a connection relationship between the event process node and the sub-process module node may be established.

The event process may be designed. The event process may include the event process node, and the connection relationship between the event process node and the sub-process module node may be established. The event process node may include an event beginning node and an event ending node. When an event happens, the main process may be interrupted, and the event process may be implemented. The main process may be implement after the event process ends.

In step S306, establishing a connection relationship between the sub-process module node and the sub-module node.

The steps S301-S304 and the step S306 of the third embodiment are respectively same as the steps S201-S205 of the second embodiment.

The event process and the event process node may be designed. The event process may be applied in the main process or a new event process may be added into the main process according to needs of robotic application. Functions of a robot may be manifold.

With reference to FIG. 3, a fourth embodiment of the present disclosure provides a flowchart of a flowchart generating method. The flowchart generating method includes the following steps.

In step S401, designing a main process and a sub-module. The main process may include a main process start, a sub-module port, and a main process end.

The sub-module may include the sub-module node, and the sub-module node may include a sub-module entry node, a sub-module exit node, and a sub-module interrupted node.

In step S402, designing a sub-process module and a logic module. The sub-process module may include a sub-process module node, and the logic module may include a logic module node.

In step S403, adding the sub-process module and the logic module into the sub-module.

In step S404, establishing a connection relationship between the sub-process module node and the sub-module node.

In step S405, designing an event process. The event process may include an event process node, and a connection relationship between the event process node and the sub-process module node may be established.

In step S406, designing an event module, and adding the event module into the event process. Further, the logic module is copied, and the copied logic module is added into the event process.

The event module may be designed, and the event module and a corresponding logic module may be added into the event process. When an event happens, the main process may be interrupted, and the event process may implement the corresponding event module and the logic module. The main process may be implement after the event process ends.

In the fourth embodiment, the event module may include an infrared module, a voice module, and a motion module. The voice module may include a voice input module, and a voice recognition module. The voice module and the motion module may be connected to the logic module.

The infrared module may receive result information of infrared sensing and range detection. When the result information satisfies a preset condition, triggering a main process of a terminal device, and receiving a control command of the voice module. The voice module and the motion module may be connected to the logic module, and the voice module may implement a corresponding logic process according to result of a voice recognition.

When the voice module is executed, the voice input module may wait for a conversation between a user and a robot, and determine content of the conversation to execute a corresponding process. The voice recognition module may recognize words input by the user, and may broadcast the words through voice.

In step S407, establishing a connection relationship between the sub-process module node and the sub-module node.

The steps S401-S405 and the step S407 of the fourth embodiment are respectively same as the steps S301-S306 of the third embodiment.

The event module and the logic module may be added into the event process. The infrared sensing, the range detection, the voice input, and the voice recognition module may be also added into the event process. Therefore, the robot may be more intelligent.

Figure 5:
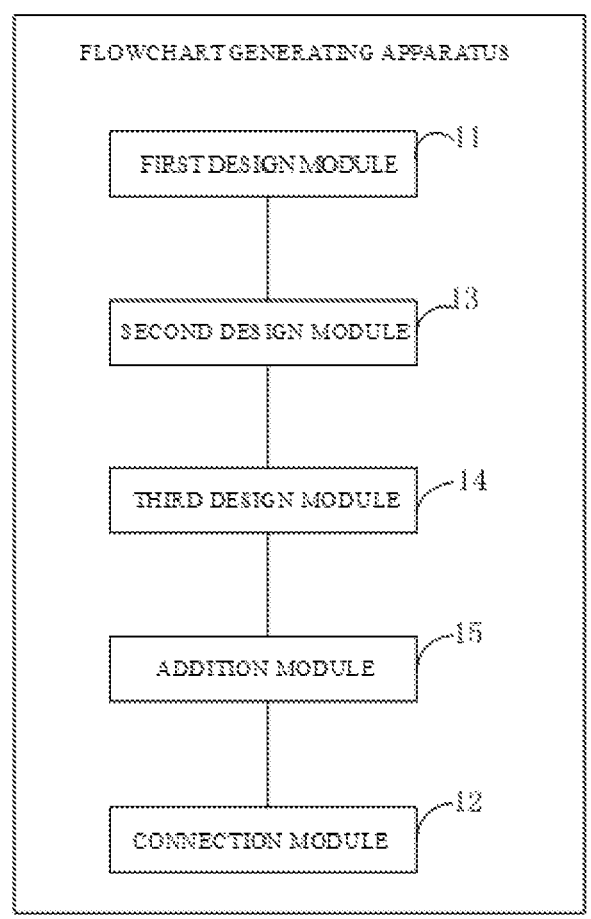
FIG. 5 is a schematic diagram of a flowchart generating apparatus of one embodiment of the present disclosure.

The present disclosure further provides a flowchart generating apparatus. With reference to FIG. 5, the flowchart generating apparatus includes:

a first design module 11 and a connection module 12;

the first design module 11, is configured to design a main process and a sub-module of a flowchart; wherein the main process includes a main process start, a sub-module port, and a main process end;

the sub-module includes a sub-module node, and the sub-module node includes a sub-module entry node, a sub-module exit node, and a sub-module interrupted node;

the connection module 12, is configured to establish a connection relationship between the sub-module and the sub-module port.

The flowchart generating apparatus further includes a second design module 13;

the second design module 13, is configured to design a sub-process module and a logic module; wherein the sub-process module includes a sub-process module node, and the logic module includes a logic module node.

The flowchart is designed by an application program of a QT graphic user interface.

The flowchart generating apparatus further includes a third design module 14;

the third design module 14, is configured to design an event process;

the event process includes an event process node;

the third design module further establishes a connection relationship between the event process node and the sub-process module node.

The flowchart generating apparatus further includes an addition module 15;

the addition module, is configured to design an event module, add the event module into the event process, copy the logic module, and add the copied logic module into the event process.

The event module may include an infrared module, a voice module, and a motion module. The voice module may include a voice input module, and a voice recognition module. The voice module and the motion module may be connected to the logic module.

The flowchart generating apparatus and the flowchart generating method are two aspects based on the same conception. The detail of the flowchart generating method has been fully described, so that the person skilled in the art may understand a structure and an implementing process of the flowchart generating apparatus. In order to simplify the description, the detail may not be repeated again.

In order to conveniently descript the flowchart generating apparatus, the flowchart generating apparatus is separated into multiple modules with different functions. However, the flowchart generating apparatus may integrate the functions into one or more software and/or hardware.

As described above, the person skilled in the art may understand that the present disclosure may be implemented by software and a common hardware platform. Based on this understanding, essence of the technical solution of the present disclosure or the technical solution contributing to the prior art may be implemented in a form of a software product. The software product may be stored in a storage medium, such as a ROM/RAM, a disc, an optical disc, etc. The software product may include a number of instructions for enabling a computer device (which may be a personal computer, a server, or a network device, etc.) to perform the methods described in certain portions of the various embodiments or embodiments of the present disclosure.

The flowchart generating method and the flowchart generating apparatus of the present disclosure may be capable of supporting cross-platform development. Therefore, resources depended by the present disclosure may be reduced, and a third-part software may not be installed.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A flowchart generating method based on QT 2D graphic view, comprising:
    designing a main process and a sub-module of a flowchart; wherein the main process comprises a main process start, a sub-module port, and a main process end;
    wherein the sub-module comprises a sub-module node, and the sub-module node comprises a sub-module entry node, a sub-module exit node, and a sub-module interrupted node configured to connect to other modules and stop running the other modules;
    establishing a connection relationship between the sub-module and the sub-module port to embed and call the sub-module in the main process.

2. The flowchart generating method of claim 1, wherein the method further comprising:
    designing a sub-process module and a logic module; wherein the sub-process module comprises a sub-process module node, and the logic module comprises a logic module node;
    adding the sub-process module and the logic module into the sub-module;
    establishing a connection relationship between the sub-process module node and the sub-module node.

3. The flowchart generating method of claim 2, wherein the method further comprising:
    designing an event process; wherein the event process comprises an event process node; and
    establishing a connection relationship between the event process node and the sub-process module node.

4. The flowchart generating method of claim 3, wherein the method further comprising:
    designing an event module;
    adding the event module into the event process;
    copying the logic module; and
    adding the copied logic module into the event process.

5. The flowchart generating method of claim 1, wherein the flowchart is designed by an application program of a QT graphic user interface.

6. A flowchart generating apparatus based on QT 2D graphic view, comprising:
    one or more processor; and
    a memory storing one or more programs which are executable by the one or more processors, the one or more programs controlling the flowchart generating apparatus to:
    design a main process and a sub-module of a flowchart; wherein the main process comprises a main process start, a sub-module port, and a main process end;
    wherein the sub-module comprises a sub-module node, and the sub-module node comprises a sub-module entry node, a sub-module exit node, and a sub-module interrupted node configured to connect to other modules and stop running the other modules; and
    establish a connection relationship between the sub-module and the sub-module port to embed and call the sub-module in the main process.

7. The flowchart generating apparatus of claim 6, wherein the one or more programs controlling the flowchart generating apparatus to:
design a sub-process module and a logic module; wherein the sub-process module comprises a sub-process module node, and the logic module comprises a logic module node;
add the sub-process module and the logic module into the sub-module;
establish a connection relationship between the sub-process module node and the sub-module node.

8. The flowchart generating apparatus of claim 7, wherein the one or more programs controlling the flowchart generating apparatus to:
design an event process: wherein the event process comprises an event process node;
establish a connection relationship between the event process node and the sub-process module node.

9. The flowchart generating apparatus of claim 8, wherein the one or more programs controlling the flowchart generating apparatus to:
design an event module, add the event module into the event process, copy the logic module, and add the copied logic module into the event process.

10. The flowchart generating apparatus of claim 6, wherein the flowchart is designed by an application program of a QT graphic user interface.

11. The flowchart generating method of claim 1, wherein:
the main process is the only entry and the only exit of a logic programming.

12. The flowchart generating method of claim 1, wherein:
the sub-process module and the logic module comprise an entry node, an exit node, and an interrupted node configured to connect to other modules and stop running the other modules;
the logic module comprises a corresponding condition, a number of cycles; and
modules is connected to corresponding entry nodes, corresponding exit nodes, and corresponding interrupted nodes are implemented according to the corresponding condition and the number of cycles, when the logic module is implemented.

13. The flowchart generating method of claim 3, wherein:
the event process node comprises an event beginning node and an event ending node; and
the main process is interrupted, the event process is implemented and the main process is implemented after the event process is ended when an event happens.

14. The flowchart generating method of claim 4, wherein:
when an event happens, the main process is interrupted, and the event process implements the corresponding event module and the logic module, and the main process is implemented after the event process is ended.

15. The flowchart generating method of claim 4, wherein:
the event module comprises an infrared module, a voice module and a motion module;
the voice module comprises a voice input module and a voice recognition module;
the voice module and the motion module are connected to the logic module;
the infrared module is configured to receive result information of infrared sensing and range detection;
the infrared module is further configured to trigger a main process of a terminal device when the result information satisfies a preset condition;
the infrared module is further configured to receive a control command of the voice module;
the voice module is configured to implement a corresponding logic process according to result of a voice recognition;
the voice input module is configured to wait for a conversation between a user and a robot, and determine content of the conversation to execute a corresponding process when the voice module is executed;
the voice recognition module is configured to recognize words input by the user and broadcast the words through voice.

16. The flowchart generating apparatus of claim of claim 6, wherein:
the main process is the only entry and the only exit of a logic programming.

17. The flowchart generating apparatus of claim of claim 16, wherein:
the sub-process module and the logic module comprise an entry node, an exit node, and an interrupted node configured to connect to other modules and stop running the other modules;
the logic module comprises a corresponding condition, a number of cycles;
modules is connected to corresponding entry nodes, corresponding exit nodes, and corresponding interrupted nodes are implemented according to the corresponding condition and the number of cycles, when the logic module is implemented.

18. The flowchart generating apparatus of claim of claim 8, wherein:
the event process node comprises an event beginning node and an event ending node; and
the main process is interrupted, the event process is implemented and the main process is implemented after the event process is ended when an event happens.

19. The flowchart generating apparatus of claim of claim 9, wherein:
when an event happens, the main process is interrupted, and the event process implements the corresponding event module and the logic module, and the main process is implemented after the event process is ended.

20. The flowchart generating apparatus of claim of claim 9, wherein:
the event module comprises an infrared module, a voice module and a motion module;
the voice module comprises a voice input module and a voice recognition module;
the voice module and the motion module are connected to the logic module;
the infrared module is configured to receive result information of infrared sensing and range detection;
the infrared module is further configured to trigger a main process of a terminal device when the result information satisfies a preset condition;
the infrared module is further configured to receive a control command of the voice module;
the voice module is configured to implement a corresponding logic process according to result of a voice recognition;
the voice input module is configured to wait for a conversation between a user and a robot, and determined content of the conversation to execute a corresponding process when the voice module is executed;

the voice recognition module is configured to recognize words input by the user and broadcast the words through voice.

* * * * *